United States Patent
Conder et al.

[11] 4,105,292
[45] Aug. 8, 1978

[54] OPTICAL ELEMENT TO ASSURE A MINIMUM SPACING

[75] Inventors: Terrence M. Conder, Stillwater, Minn.; Terence A. Jones, Columbia, Mo.

[73] Assignee: Minnesota Mining and Manufacturing Company, St. Paul, Minn.

[21] Appl. No.: 779,892

[22] Filed: Mar. 21, 1977

Related U.S. Application Data

[63] Continuation of Ser. No. 609,428, Sep. 2, 1975, abandoned.

[51] Int. Cl.² ............................................... G02B 3/08
[52] U.S. Cl. ................................... 350/211; 350/69
[58] Field of Search .............. 350/69, 233, 319, 211, 350/288; 353/102, 120

[56] References Cited

U.S. PATENT DOCUMENTS

3,876,299   4/1975   Brown, Jr. .................... 350/241 X

Primary Examiner—John K. Corbin
Assistant Examiner—Matthew W. Koren
Attorney, Agent, or Firm—Cruzan Alexander; Donald M. Sell; Robert C. Beck

[57] ABSTRACT

An optical system incorporating between two opposed contacting surfaces projections having a height of between 1 micron and 130 microns to space the surfaces a distance greater than twice the wave length of light in the visible spectrum to reduce interference patterns (Newton Rings) in a projected image and not substantially reduce the light transmission.

1 Claim, 5 Drawing Figures

OPTICAL ELEMENT TO ASSURE A MINIMUM SPACING

This is a continuation application Ser. No. 609,428 filed Sep. 2, 1975, now abandoned.

BACKGROUND OF THE INVENTION

1. Field of the Invention

This invention relates to an improvement in optical elements and in one aspect to an improved optical element such that a smooth surface of a juxtaposed element will not approach the surface of the first element closer than one micron and cause visible light interference patterns in the projected image.

2. Description of the Prior Art

An increasing number of optical systems have been made utilizing polymeric material such as methyl methacrylate polymer to define the optical elements, and in many cases the optical elements have been prealigned and secured together such that the elements form an optical system which is sold as an integral unit. Such structures are utilized in overhead projectors and other film or transparency projectors. In systems of this type a smooth surface of one lens element is often placed in contact with a smooth surface of another element or with another surface of a transparent positioning member in a machine. In instances where these surfaces are opposed they are substantially in intimate contact but not totally because of imperfect surfaces resulting thereby in the surfaces being spaced apart less than 1 micron or a distance which is about ¼ of the wave length of light in the visible spectrum. As a result interference patterns (Newton Rings) appear due to the multiple reflections of light between the surfaces. Therefore, it was necessary to solve the problem by a sure efficient and inexpensive way of maintaining a space between the surfaces of at least twice the wave length of light in the visible spectrum (at least 1 micron) and yet not space the elements to such an extent that the size of the optical system was substantially increased. The problem of Newton Rings can be avoided by bonding the two surfaces. This is not very desirable in a projection system where the two adjacent optical elements are formed of different materials with different coefficients of thermal expansion. The constant change in temperature causes a deleterious effect in the bond. Therefore, the need for an inexpensive system to substantially restrict the possibility of Newton Rings appearing or to eliminate them was necessary.

The present invention provides a structure for removing the objectionable Newton Rings in an optical system wherein two surfaces are juxtaposed and move toward or away from each other upon the system being subject to changes in temperature and/or pressure.

SUMMARY OF THE INVENTION

The present invention relates to an improvement in optical systems wherein a plurality of elements in the light path forming a portion of the optical system are in juxtaposed contacting relationship with each other. The purpose of the invention is to minimize or substantially reduce the appearance of Newton Rings in the projection from the optical system. The system is improved by forming on the surface of one transparent element a plurality of spaced projections or humps, about 100 projections per square millimeter, the height of which is between 1 micron and 130 microns and preferably, between 10 to 60 microns in size. These projections maintain a minimum separation in the optical system between this surface and a smooth juxtaposed surface. The projections are sufficiently scattered and have a size such that they do not reduce the light transmissivity of the surface or of the optical element by more than 5% and preferably not substantially greater than 2%. The projections are randomly spaced in the illustrated embodiment as a result of the presently known best mode for forming the projections on an element.

The illustrated surface is formed on one of the elements, which element is formed of polymethyl methacrylate, by pressing an irregular surface against the optically smooth surface of the optical element in a press and forcing the material to conform to the face of a press back plate. A press plate is formed of a smooth machined carbon steel chrome plated member contacted on one surface thereof with the abrasive surface of a sheet of silicon carbide abrasive material having a grit size of 220. The abrasive surface of the sheet is pressed against the surface of the press back plate under a pressure of 210 kilograms per square centimeter.

DESCRIPTION OF THE ACCOMPANYING DRAWINGS

The above invention will be more fully described with reference to the accompanying drawing wherein.

DETAILED DESCRIPTION OF THE PREFERRED EMBODIMENT

The present invention relates to an improvement in an optical element wherein the optical element is to be disposed in juxtaposed contacting relationship with another light-transmitting element in an optical system. The present invention provides projections between two lens element surfaces such that the minimum spacing will exceed twice the wave length of light. By so spacing the surfaces, which are not cemented together, and which may be moved into and out of intimate contact due to changes in temperatures to which the optical system is subjected, the present invention will assure that a predetermined minimum spacing is maintained to eliminate a spacing of less than ¼ wave length and thus avoid the presence of Newton Rings appearing on the projected image of the system due to the multiple reflections of light between two spaced smooth surfaces.

The present invention is thus related to an optical element for an optical system wherein the element is to be closely positioned to a smooth surface of another element such that temperature and/or pressure can cause the surfaces to move toward one another. The invention of providing one surface with spaced projections or bumps such that an opposing element surface cannot contact the surface and be closer thereto than ½ wave length of light eliminates the problem inexpensively. With light having a wave length of 400 to 700 nanometers (4000–7000 Angstroms) it has been discovered that it is desirable to maintain a spacing between the elements of between 1 and 100 microns.

Figure 1:
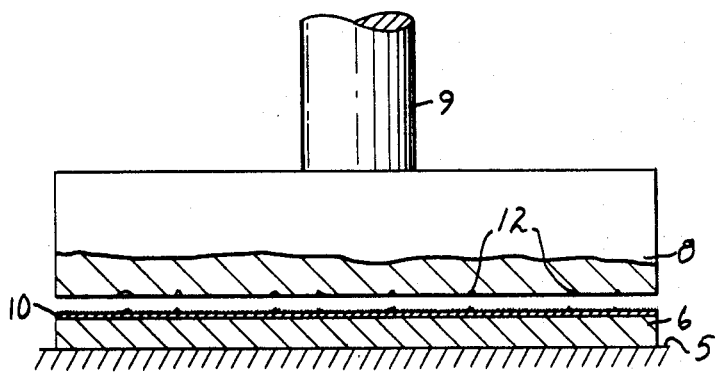
FIG. 1 is a schematic view of the process for forming a press plate for producing a lens element according to the present invention.

The desired spacing of the projections on the optical element formed of a polymeric material is achieved by using a press plate formed with recesses in the desired pattern and of the desired depth such that the projections may be formed by the application of heat and pressure during the stamping or forming of the lens elements. This may be done by pressing the press back plate against the surface of a sheet of abrasive material formed with silicon carbide particles as will hereinafter be explained. Referring now to FIG. 1 there is shown a hydraulic press having a stationary bed 5 upon which may be placed a support plate 6. The hot rolled carbon steel chrome plated and polished press back plate 8 is positioned to be movable by a ram 9 toward and away from the plate 6. Positioned between the two is a sheet 10 of abrasive material with the abrasive surface directed toward the polished face of the back plate. The preferred material is a sheet of TRI-M-ITE "Wetordry" waterproof coated abrasive material accessible from Minnesota Mining and Manufacturing Company, Saint Paul, Minn., U.S.A. as closed coat silicon carbide abrasive material, 220 grit. The back plate is moved into contact with the abrasive particles under a pressure of 210 kilograms per square centimeters. This will cause indentations to be formed in the surface of the back plate in a random pattern and at different depths but in such a manner that further use of the back plate of the press to press large area incremental optical lenses from sheets of material as illustrated in FIG. 2, will result in the formation of the incremental surfaces on one side and the presence of projections on the opposite surface.

Figure 2:
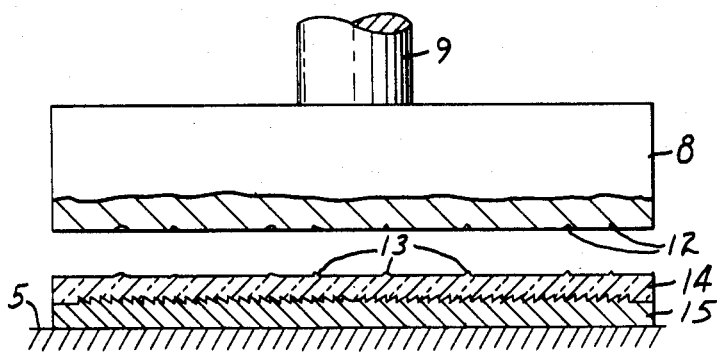
FIG. 2 is a schematic view of a press having a tooled stamper and press back plate for forming lens elements constructed according to the present invention.

Referring now to FIG. 2 there is illustrated schematically the press back plate 8 formed with indentations 12 lifted from contact with a sheet of polymeric material which has just been pressed under heat and pressure to form a lens 14. On the surface of the sheet contacting the press plate 8 are formed projections 13 in the form of humps extending from the surface. The opposite surface of the lens 14 is formed with a plurality of ridges and grooves forming a Fresnel-type optical surface. This optical surface was formed against the tooled stamper 15 placed in the press on the bed 5 opposite the back plate 8.

Figure 3:
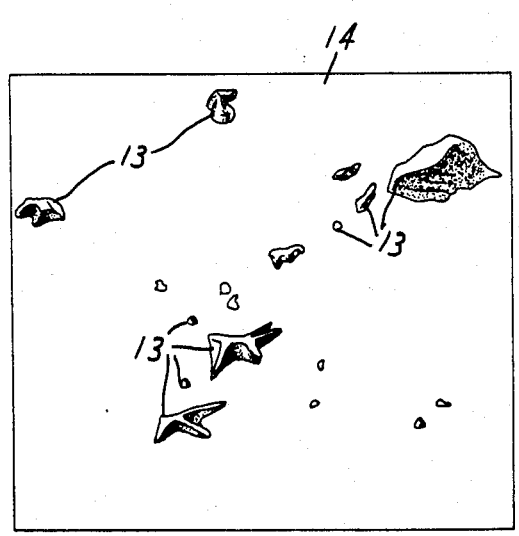
FIG. 3 is a perspective view of a small area on one surface of an optical element illustrating the present invention.

Referring now to FIG. 3, which is a lined drawing of a scanning electron micrograph showing a tiny area of a surface formed in accordance with the present invention at a 45° tilt with respect to the instrument and 520 times magnification. This FIG. illustrates the random size and position of the projections 13. The size is determined in this manner to be from about 10 to about 60 microns with a population density of 100 projections per square millimeter.

Figure 4:
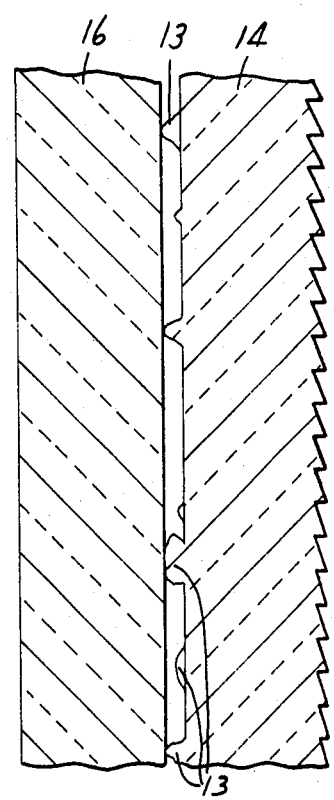
FIG. 4 is an enlarged detailed cross-sectional view of two lens elements of an optical system illustrating the present invention.

FIG. 4 illustrates an enlarged cross-sectional view of the lens 14 formed in accordance with the above-described process in contact with a second optical element 16 in an optical system. The lens 14 may be in contact with a smooth surface of a glass stage as in an overhead projector or the lens may be positioned in contact with a smooth face of a transparency. In any event, whatever the materials, since they are not cemented together and the presence of air between the two surfaces results in the presence of layers of different refractive index, the light is reflected between the closely spaced surfaces and unless the spacing is maintained as illustrated in FIG. 4, to be at least twice the wave length of light in the visible spectrum, the interference patterns would result. The presence of the projections on one of the elements to maintain a predetermined minimum spacing of 1 micron to 130 microns substantially reduces the presence of the light interference patterns appearing in the projected image.

The pressed plate may be embossed with other sizes of silicon carbide abrasive material. For example, the following table will show the results of tests made using various grit sizes to emboss polymethyl methacrylate.

| Grit Size | Projection Size (microns) | Light Loss (percentage) |
| --- | --- | --- |
| 400 | 1 | 2.4 |
| 240 | 52 | 2.6 |
| 220 | 66 | 3.04 |
| 180 | 80 | 3.4 |
| 150 | 100 | 3.6 |
| 100 | 130 | 4.08 |

The projections may also be produced by first forming the indentations in the press back plate by electron bombardment to selectively produce therein the desired size and spacing of the indentations and subsequent projections. Another alternative for forming projections on the surface of a polymeric lens is to place the shiny side of an aluminum foil in contact with the sheet from which the lens is to be formed and the other face contacting the press back plate. The aluminum foil, preferably the foil sold under the brand name "Reynolds Wrap" by Reynolds Metals Company, Richmond, Va. 23261, will thus cause the formation of a slight matte surface, producing the desired projections and not significantly reducing light transmission.

Figure 5:
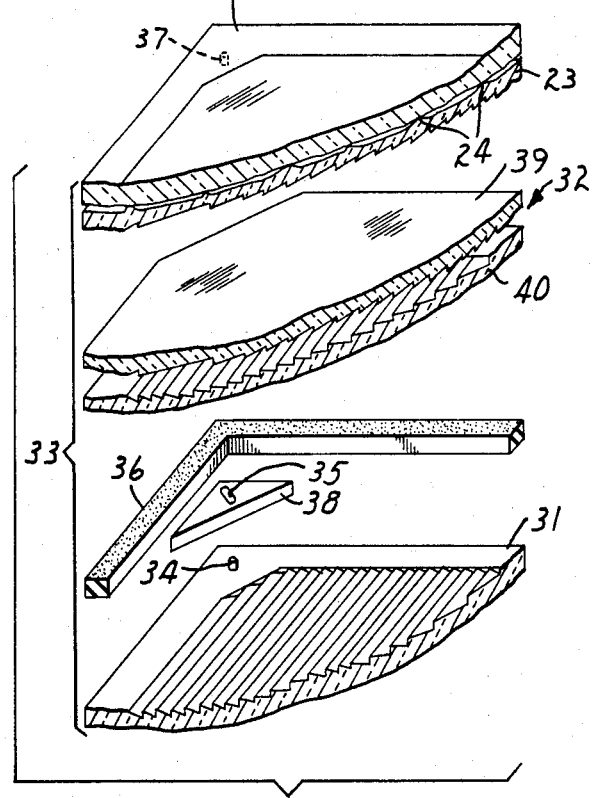
FIG. 5 is a detailed exploded perspective view of an optical system for use on an overhead projector which incorporates an element constructed according to the present invention.

The optical structure shown in FIG. 5 combines a glass panel stage 21, a first lens 23 having a surface formed with projections 24 between the lens surface and the smooth flat face of the stage 21, and a second lens 31 and, if desired, a lens pair 32 to form a composite lens and stage assembly 33 as employed in an overhead projector. A rubbery gasket 36 is bonded between the smooth margin of the plastic lens 23 surrounding the incremental surface thereof and the margin of the plastic lens 31 to hold the two together while affording a space for the lens pair 32. An adhesive may be used to bond the margin of the stage 21 to the opposed surface of lens 23.

Accurate positioning of the several lens components is afforded by the presence at three corners of lens 23 of alignment pegs 37, formed in apertures in the tooled stamper and extending from the flat corner margins, and of opposing pegs 34 similarly formed on lens 31. These opposing pegs fit snuggly within radially extending oval apertures 35 in corner inserts 38. The corner inserts serve to place and hold the two outer lenses in accurate optical alignment.

Lenses 23 and 31 may have a circular incremental lens pattern, for example, as described in U.S. Pat. No. 3,334,958, issued Aug. 8, 1967 to R. H. Appeldorn, in which case the inner lens pair 32 is omitted. The lenses 23 and 31 may alternatively have a linear incremental pattern and be oriented with their cylindrical axis at approximately a right angle to each other as described in copending application Ser. No. 499,138, filed Aug.

21, 1974, by R. H. Anderson et al, now abandoned in favor of continuation application Ser. No. 698,116, filed June 21, 1976, and assigned to the assignee of this application, thereby replacing a single circular incremental lens. The lens pair 32, may be a pair of linear incremental lenses such as lenses 39 and 40, may then be substituted for a second circular incremental lens. The second pair are bonded together at the corners in permanent alignment and are further aligned within the stage lens composite 33, either by contact of their truncated corners with the corner insert 38 as illustrated in FIG. 5.

Having thus described the present invention with respect to the illustrated preferred embodiment and several alternatives, what is claimed is:

1. An improved condensing lens system for use in an overhead projector including

- a light transmissive stage element having at least one smooth surface area;
- at least one light-transmissive polymeric lens element having a first surface area configured as an incremental lens and a second surface area, arranged such that a smooth surface area of said stage element is juxtaposed with said second surface of said lens element,
- the improvement comprising a plurality of randomly spaced projections on said second surface of said lens element having random heights ranging from 1 to 130 microns with an average height ranging from 10 to 60 microns, and having random base areas and having a population density of approximately 100 projections per square millimeter for maintaining a minimum spacing between said stage and said lens elements.

* * * * *